United States Patent [19]
Schnell

[11] Patent Number: 6,070,992
[45] Date of Patent: Jun. 6, 2000

[54] LASER POINTER HAVING REPLACEABLE SELF-STORING PARTS

[76] Inventor: Tim Schnell, 3708 Cobblestone Ct., Bedford, Tex. 76021

[21] Appl. No.: 09/137,895

[22] Filed: Aug. 20, 1998

[51] Int. Cl.⁷ .................................................. F21K 7/00
[52] U.S. Cl. ............................................ 362/259; 362/109
[58] Field of Search ................................. 362/259, 118, 362/119, 109, 806; 353/42

[56] References Cited

U.S. PATENT DOCUMENTS

| | | | |
|---|---|---|---|
| 5,268,829 | 12/1993 | Lo | 362/259 |
| 5,307,253 | 4/1994 | Jehn | 362/259 |
| 5,343,376 | 8/1994 | Huang | 362/259 |
| 5,788,359 | 8/1998 | Halsey et al. | 362/259 |
| 5,897,200 | 4/1999 | Ho | 362/259 |
| 5,938,315 | 8/1999 | Chao | 362/259 |

*Primary Examiner*—Thomas M. Sember
*Attorney, Agent, or Firm*—Schwegman, Lundberg, Woessner, Kluth, P.A.

[57] ABSTRACT

A pocket laser pointer has a mounting for detachably holding any of a number of different end caps for modifying the pointer beam in different ways. The pointer shell includes another mounting for detachably holding another of the endcaps that is not in use, so that the end caps can be interchanged for producing different beam characteristics.

19 Claims, 1 Drawing Sheet

U.S. Patent    Jun. 6, 2000    6,070,992
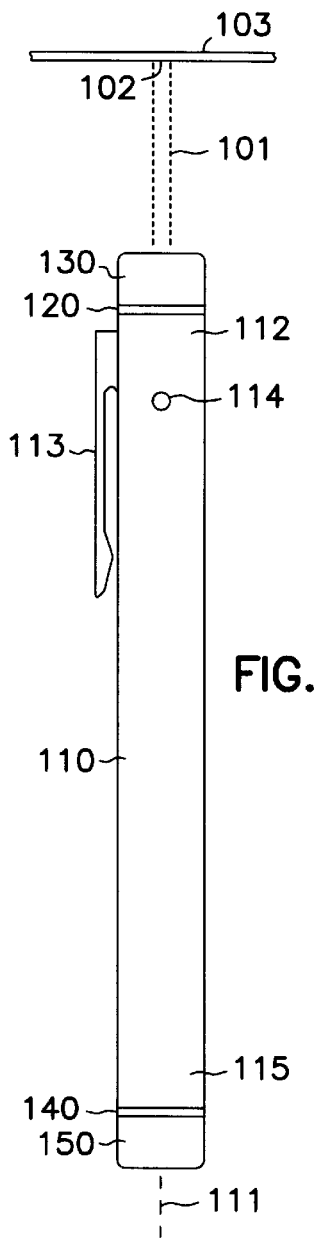
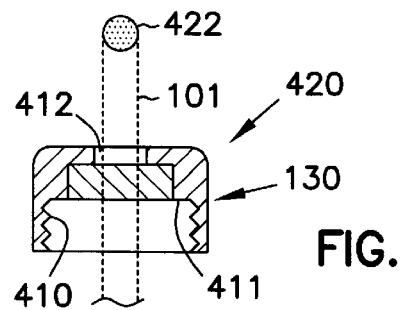
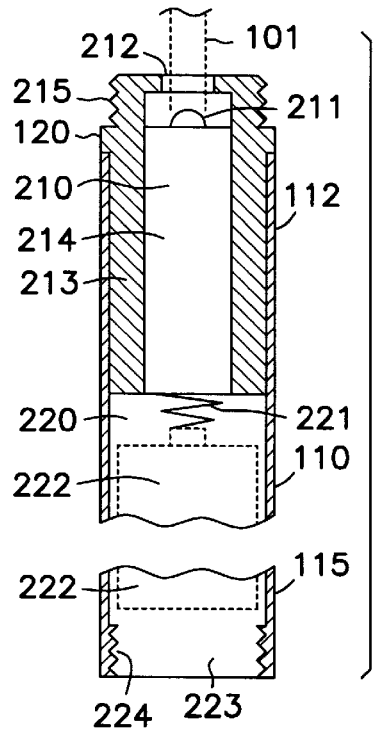
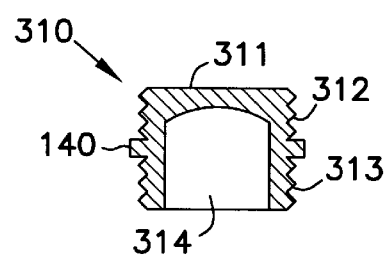
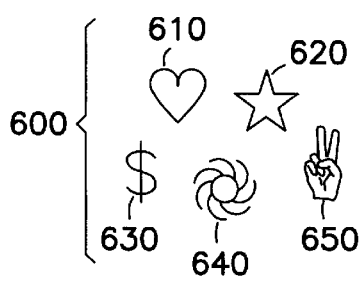
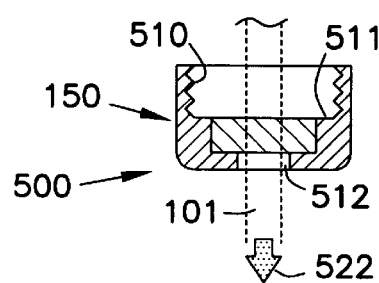

LASER POINTER HAVING REPLACEABLE SELF-STORING PARTS

BACKGROUND OF THE INVENTION

The present invention relates to optical instruments, and more particularly concerns a pocket laser pointer with interchangeable parts.

The product commonly called a pocket laser pointer has become a popular item for professionals, salesmen, teachers, and others who give presentations involving projected images. Once developed for that use, it has found other uses among other groups of people as well. This device usually has a long, thin shape similar to that of a pen, and projects a thin pointing beam from one end. The technology for producing this beam can include a small semiconductor laser, but can also be a light-emitting diode or other existing or future technologies.

Early laser pointers employed a beam that produced a simple round dot as an image on a target surface. More recent laser pointers can produce other shapes and sizes, such as an arrow, an outline of an animal, and so forth. The beam shape and size are determined by a mask, lens, or other means for altering the cross section and/or other characteristics of the beam.

Frequently, a user desires to have the ability to produce beams having multiple beam characteristics, sometimes even during the course of a single presentation. The expense and inconvenience of carrying multiple laser pointers make that solution unfeasible. One laser pointer has multiple lenses mounted in a circular format so that different lenses can be rotated into the optical beam. Such a pointer, however, does not have the convenient pen configuration. The number and patterns of the lenses are fixed at manufacture.

Therefore, there is a need for a single laser pointer, especially of the pen-like configuration, that can modify the beam characteristics easily, inexpensively, and flexibly.

SUMMARY OF THE INVENTION

The present invention allows a user to modify the beam characteristics of a laser pointer inexpensively and in a manner that does not interfere with its portability or convenience.

Briefly, a handheld laser pointer according to the invention has an elongated shell and an optical generator that produces a pointer beam from one end. A device for modifying the beam characteristics is removably attached to a mounting at that end. Another beam-modifying device can also be attached to the same mounting for varying the beam characteristics in a different way. The shell further includes a second mounting compatible with the first mounting for removably attaching either of the beam devices, so that the device not in use at the moment can be stored on the pointer itself.

In this way, a user of the laser pointer can carry multiple beam-modifying devices without danger of losing those not currently in use. At the same time, changing to an alternative device is a simple and quick matter of interchanging the devices on the first and second compatible mountings.

DESCRIPTION OF THE DRAWING

FIG. 1 is a side view of a laser pointer incorporating the invention.

FIG. 2 is a partial cross-section of the laser pointer of FIG. 1.

FIG. 3 is a cross-section of a beam-modifying end cap for the laser pointer.

FIG. 4 shows a rear mounting for the laser pointer.

FIG. 5 shows a second beam-modifying end cap for the laser pointer.

FIG. 6 shows a few additional mask patterns.

DETAILED DESCRIPTION

The following, taken in conjunction with the accompanying drawing, describes one embodiment of the present invention. Some changes and variations that might be desirable in particular applications are mentioned specifically. Other variations within the spirit of the invention, as well as further advantages and uses of the invention, will become apparent to those skilled in the art. The scope of the invention is measured only by the claims appended hereto.

FIG. 1 is an exterior view of a laser pointer 100 for projecting a pointing beam 101 so as to form an image 102 on a surface 103. Products of this kind generally throw a thin, low divergence beam having a diameter less than about 0.1 inch and a spread less than about 0.2°. In typical situations, image 102 appears on a surface 103 over a large range of distances, from less than 3 feet to more than 1500 feet away from laser pointer 100, depending mostly upon the beam's power, and upon approval by the appropriate government agency. Because of the low beam divergence, image 102 will remain small, typically less than 0.5 inch, even at maximum distance.

The exterior of laser pointer 100 is conveniently of a size and shape adapted to be held in the user's hand and further adapted to fit in a pocket or in a small handbag, for portability. Such a configuration is also well adapted for hanging the pointer on a cord around the user's neck or wrist, and for laying it on a small table along with other marker pens and other paraphernalia employed in presentations.

An outer shell or housing 110 therefore has a body size and shape similar to that of a fountain pen or similar article, that is, very roughly less than about 7 inches long and less than about 0.5 inch in diameter. The elongated shell is substantially cylindrical in cross section, having a longitudinal axis 111. Although axis 111 coincides with the direction of beam 101 in this embodiment, the beam could be emitted in other directions as well. Shell 110 can be manufactured from any suitable thin material, such as brushed aluminum, brass, or plastic. A front end 112 of the shell includes a pocket clip 113 and a momentary-contact push-button switch 114 extending through the shell for actuation by a user. Other conventional types of switch are also compatible with use in the invention. A purely decorative collar 120 separates shell end 112 from a detachable end cap 130 that also functions as a device for modifying beam 101.

At a rear end 115, another decorative collar 140 visually separates shell 110 from a second end cap 150. This end cap is also detachable from shell 110. It functions as another beam-modifying device that can be used in place of end cap 130. Thus, the beam can be modified in a different way merely by detaching end caps 120 and 150 and interchanging them for each other. This arrangement prevents the loss of the physically small alternative beam-modifying devices 130 and 150. It also permits a pleasing appearance, because the similar functions of the different end caps also allows them to be visually similar to each other and compatible with the appearance of the shell.

FIG. 2 shows a cross-section of the body of laser pointer 100. At the front region 112 is an optical assembly 210 for producing the pointing beam 101 by means of an optical generator 211 such as a small semiconductor laser behind aperture 212 in casing 213. The internal electronics 214 can be of any conventional type, and are not detailed in FIG. 2. A ridge on casing 213 provides collar 120. The front portion of casing 213 is threaded to provide a mounting 215 for detachably mounting one of a number of end caps such as 130 and 150, FIG. 1 near the front end of shell 110 so as to intercept beam 101.

The rear portion 115 of shell 110 forms a power supply 220 for optical assembly 210. Spring 221 engages one electrode of an AAA cell or other conventional battery fitting inside shell 110, and acts as an electrical connection to electronics package 214. The spring may be held in place by any conventional means to maintain it in proper position when cell is removed and when the pointer body shifts position. Dashed lines 222 indicate one or more cells insertable through opening 223 in shell 110. Threads 224 receive a metallic plug or other closure 310, FIG. 3, that both physically seals opening 223 and forms an electrical contact 311 for a cell 222. That is, shell 110 itself completes the electrical circuit for assembly 210. Of course, the required circuit could be completed in other conventional ways as well. Plug 310 has threads 312 or other means for attaching it to the rear portion 115 of shell 110. The rear end of plug 310 is also threaded to provide another mounting 313 for detachably receiving and holding end caps such as 130 and 150. A ridge forms collar 140 seen in FIG. 1. In addition to its decorative function, collar 140 also provides a friction point for preventing plug 310 from loosening when it is screwed tightly into shell 110, and provides a further friction stop for an end cap that tightly engages threaded mounting 313. Moreover, plug 310 provides all these functions in an easily manufacturable configuration, such as a machined brass rod. Cavity 314 in the plug gives it a lighter weight, both to make the entire pointer 100 lighter and to improve its balance with respect to the weight of optical assembly 210.

FIG. 4 is a cross-section of end cap 130, FIG. 1, that serves as a beam-modifying device. Mounting 410 is a set of internal threads that cooperate with threads 215, FIG. 2, to mount end cap 130 at the front of shell 110 so that it can be detached or released easily. A bayonet or other conventional mechanism would also serve, as long as an end cap that can be attached at 215 can also be releasably attached to rear mounting 313. Beam modifier 420 here comprises a mask 421 wedged into shoulder 411 so that beam 101 is shaped into a dot, shown as 422 in beam 101. Beam 101 then shines through aperture 412. For a simple shape, aperture 412 itself can be employed as a beam-modifying device, rather than using a mask with a clear area in the shape and size of the desired beam.

FIG. 5 shows an end cap 150 whose internal threads 510 cooperate with threads 313, FIG. 3 to form a mounting means for releasably or detachably mounting cap 150 on plug 310 at the rear end of shell 110. Because threads 313 are the same as threads 215, end cap 150 can thus be mounted at either end 112 or 115 of pointer 100. Optical modifier 520 can function in the same manner as modifier 420, FIG. 4, using mask 521, shoulder 511, and aperture 512. In this case, however, the shape, size, or other characteristic of beam 101 is different, e.g., an arrow 522. The method by which modifier 520 alters beam 101 can differ from that used by modifier 420 in cap 130.

Additional end caps, not shown, can of course be purchased with the pointer or at a later time, and substituted for one of the end caps 130 and 150.

FIG. 6 shows some additional patterns 600 that can be provided to modify the laser beam shape in end caps such as 13 and 150. Patterns 610 and 620 are simple symbol shapes; 630 and 640 are more complicated. Pattern 650 is an image of a hand. Other images, such as animals, can also be used.

Other beam modifiers may function in the same way or in a different manner. Although the specific form of laser pointer 100 shown herein can accommodate only two different end caps at once, it is possible to provide additional mountings for holding three or more at once. For example, part of the outer cylindrical surface of the end caps 130, 150, and 600 could carry external threads (not shown) so that cap 150 could be screwed into plug 310 at the rear of shell 110, cap 600 could be screwed into the external threads of cap 150, and so forth. Any of these stacked caps detachably mounted at the rear of shell 110 could then be unscrewed and substituted for cap 130 so as to modify the beam or perform some other function different from that of cap 130. Cap 130 would then be added to the stack at the rear of shell 110 merely by screwing it into one of the caps already mounted there.

I claim as my invention:

1. A handheld optical pointer, comprising:
   an elongated shell configured to be held in the hand of a user and having a longitudinal axis and first and second end portions;
   an optical generator disposed in the first end portion of the shell for producing a thin pointer beam;
   a power supply for the optical generator;
   a switch for activating the optical generator;
   first and second end caps for modifying the pointer beam in first and second different ways;
   first and second mountings disposed at the first and second end portions of the shell, both of the mountings being adapted to detachably mount either of the end caps.

2. The pointer of claim 1 wherein the shell is substantially cylindrical.

3. The pointer of claim 1 wherein the mounting means include screw threads.

4. The pointer of claim 3 wherein at least one of the mounting means has a collar engaging one end of the shell.

5. The pointer of claim 1 wherein the power supply is a tubular compartment for holding at least one electrical cell.

6. The pointer of claim 5 wherein the cell is substantially cylindrical.

7. The pointer of claim 5 wherein the tubular compartment includes a closure at the second end.

8. The pointer of claim 5 wherein the closure forms a part of the second mounting.

9. The pointer of claim 1 wherein the switch is a momentary contact switch protruding through the shell.

10. The pointer of claim 1 further comprising a pocket clip affixed to the shell.

11. The pointer of claim 1 wherein one of the end caps includes means for modifying the pointer beam into a dot shape.

12. The pointer of claim 11 wherein the other of the end caps includes means for modifying the pointer beam into a shape other than a dot.

13. The pointer of claim 12 wherein the other of the end caps includes means for modifying the pointer beam into an arrow.

14. An end cap for a handheld optical pointer including an elongated shell configured to be held in the hand of a user and having a longitudinal axis and first and second end portions, an optical generator disposed in the first end portion of the shell for producing a thin pointer beam;

a power supply for the optical generator, a switch for activating the optical generator, and first and second positive mounting mechanisms formed in the first and second end portions of the shell, the end cap comprising:

means for modifying the pointer beam; and positive mounting means for detachably mounting the end cap on either of the mounting mechanisms formed in the first and second end portions of the shell.

15. The end cap of claim 14 wherein the end cap is substantially cylindrical.

16. The end cap of claim 14 wherein the modifying means modifies the pointer beam into a dot shape.

17. The end cap of claim 14 wherein the modifying means modifies the pointer beam into a shape other than a dot.

18. The end cap of claim 17 wherein the modifying means modifies the pointer beam into an arrow shape.

19. An end cap for a handheld optical pointer including an elongated shell configured to be held in the hand of a user and having a longitudinal axis and first and second end portions, an optical generator disposed in the first end portion of the shell for producing a thin pointer beam;

a power supply for the optical generator, a switch for activating the optical generator, and first and second mountings disposed at the first and second end portions of the shell, the end cap comprising:

means for modifying the pointer beam; and a screw thread for detachably mounting the end cap on either of the first and second end portions of the shell.

\* \* \* \* \*